US012486986B2

(12) United States Patent
Erisgen et al.

(10) Patent No.: US 12,486,986 B2
(45) Date of Patent: Dec. 2, 2025

(54) PORTABLE HEATER WITH INTERCHANGEABLE BATTERY

(71) Applicant: Pinnacle Climate Technologies, Inc., Eden Prairie, MN (US)

(72) Inventors: Sukru Erisgen, Eden Prairie, MN (US); Jacob Frame, Eden Prairie, MN (US)

(73) Assignee: Pinnacle Climate Technologies, Inc., Eden Prairie, MN (US)

( * ) Notice: Subject to any disclaimer, the term of this patent is extended or adjusted under 35 U.S.C. 154(b) by 728 days.

(21) Appl. No.: 17/401,840

(22) Filed: Aug. 13, 2021

(65) Prior Publication Data

US 2022/0049851 A1    Feb. 17, 2022

Related U.S. Application Data

(60) Provisional application No. 63/065,296, filed on Aug. 13, 2020.

(51) Int. Cl.
| | |
|---|---|
| *F24C 3/14* | (2021.01) |
| *H01M 50/247* | (2021.01) |
| *H01M 50/267* | (2021.01) |
| *H02J 7/00* | (2006.01) |

(52) U.S. Cl.
CPC ............. *F24C 3/14* (2013.01); *H01M 50/247* (2021.01); *H01M 50/267* (2021.01); *H02J 7/0013* (2013.01); *H02J 7/0045* (2013.01); *H02J 7/0063* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 5,280,229 A | 1/1994 | Faude et al. | |
| 6,075,341 A | 6/2000 | White et al. | |
| 6,104,162 A * | 8/2000 | Sainsbury | H02J 7/0069 320/111 |
| 11,495,929 B1 * | 11/2022 | Murray | H01M 50/247 |
| 2002/0067080 A1 * | 6/2002 | Neumann | H02J 7/0044 307/150 |
| 2004/0106080 A1 | 6/2004 | Vandrak et al. | |
| 2011/0012560 A1 * | 1/2011 | Sakakibara | H01M 10/441 320/118 |
| 2011/0197389 A1 * | 8/2011 | Ota | H02J 7/007182 429/121 |

(Continued)

FOREIGN PATENT DOCUMENTS

JP    2014135192 A  *  7/2014

OTHER PUBLICATIONS

Machine translation JP2014135192A Google Patents (Year: 2024).*
International Search Report and Written Opinion for PCT/US2021/045858, mailed Dec. 6, 2021.

*Primary Examiner* — Edelmira Bosques
*Assistant Examiner* — Deepak A Deean
(74) *Attorney, Agent, or Firm* — Merchant & Gould P.C.

(57) ABSTRACT

The present disclosure relates to portable forced air heaters and radiant heaters. Portable air forced air heaters include a blower, a blower housing, a burner disposed within the burner housing, a fuel tank in fluid communication with the burner, a fan pump and a battery connector. The battery connector of this disclosure allows for different batteries with different distinguishing features to be used.

21 Claims, 12 Drawing Sheets

(56) References Cited

U.S. PATENT DOCUMENTS

| | | | |
|---|---|---|---|
| 2011/0265779 A1* | 11/2011 | Vandrak | F24H 9/06 |
| | | | 126/93 |
| 2011/0279090 A1* | 11/2011 | Bauer | H02J 7/0042 |
| | | | 307/77 |
| 2013/0051104 A1* | 2/2013 | Nakano | H02J 7/0045 |
| | | | 320/110 |
| 2015/0035479 A1* | 2/2015 | Wright | H02J 7/0049 |
| | | | 320/107 |
| 2015/0303417 A1 | 10/2015 | Koeder et al. | |
| 2015/0318716 A1* | 11/2015 | Pickens | H02J 7/0042 |
| | | | 320/110 |
| 2016/0344002 A1* | 11/2016 | Duncan | H01M 50/267 |
| 2016/0372939 A1* | 12/2016 | Roehm | B25F 5/00 |
| 2018/0147713 A1* | 5/2018 | Schmauder | B25F 5/02 |
| 2019/0120475 A1* | 4/2019 | Wu | F21V 14/02 |
| 2020/0058910 A1* | 2/2020 | Poirier | H01M 50/258 |
| 2021/0178569 A1* | 6/2021 | Huang | H02J 7/0045 |
| 2023/0283091 A1* | 9/2023 | Olsson | H02J 7/0063 |
| | | | 320/136 |

* cited by examiner

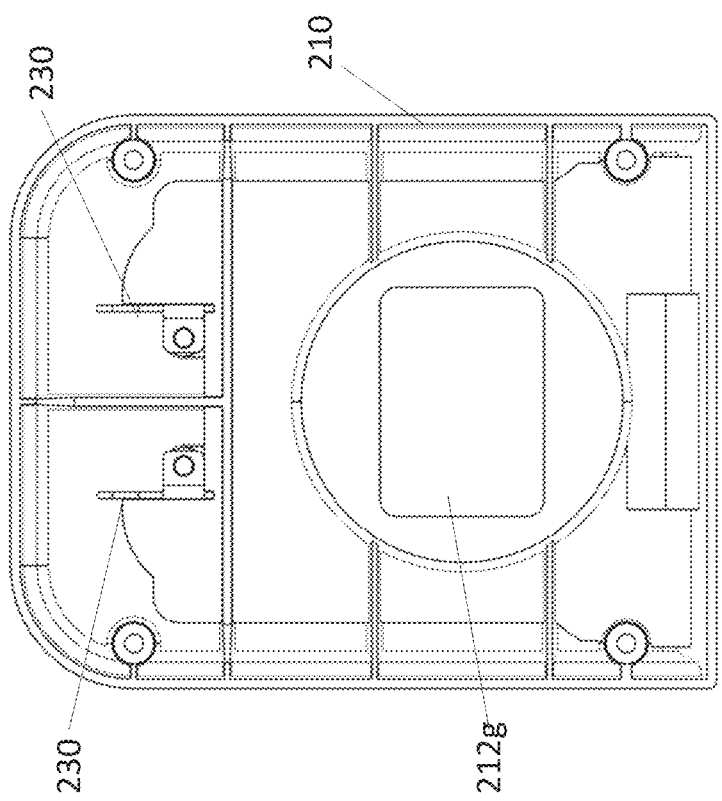
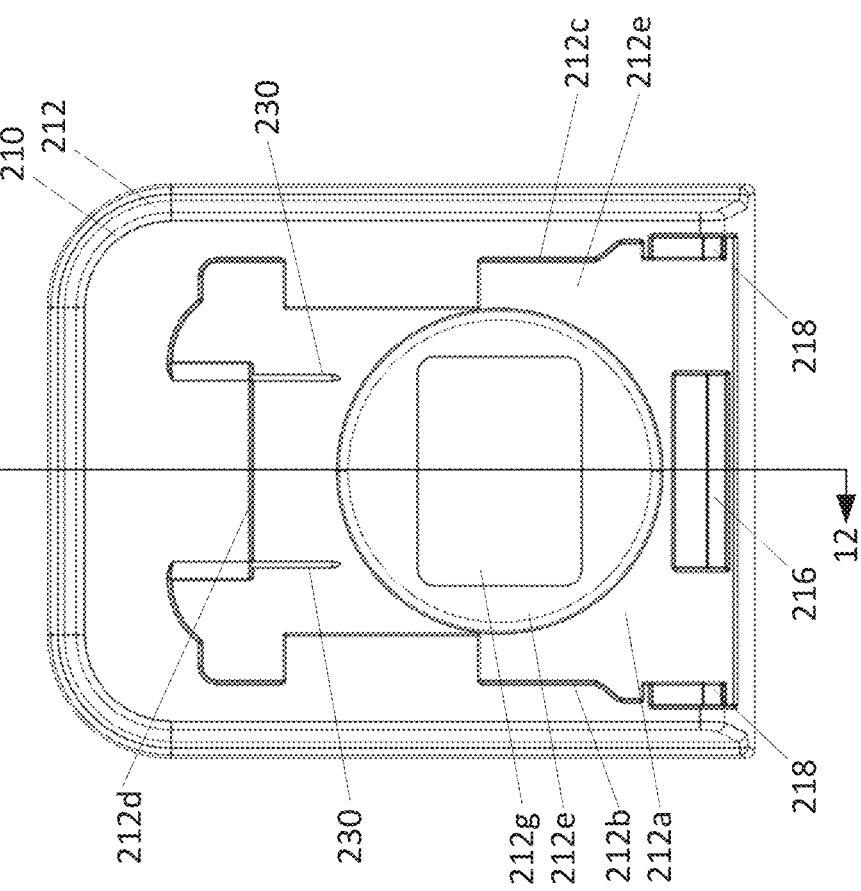

PRIOR ART

PRIOR ART

PRIOR ART

PORTABLE HEATER WITH INTERCHANGEABLE BATTERY

CROSS-REFERENCE TO RELATED APPLICATION

This application claims the benefit of U.S. Provisional Application Ser. No. 63/065,296, filed Aug. 13, 2020, the disclosure of which is hereby incorporated by reference in its entirety.

TECHNICAL FIELD

The present disclosure relates generally to portable heaters. More particularly, the present disclosure relates to types of portable heaters with electrically powered components.

BACKGROUND

Various types of portable liquid and gas fired heaters have been on the market for many years. Referring to FIGS. 14, 15, and 16, examples of prior art portable heaters are shown. In general, portable heaters are categorized by two basic characteristics: the type of fuel they burn and how they transfer the heat produced in order to be useful. The fuel types are classified as either liquid fuels or gas fuels. Liquid fuels commonly used are kerosene, #1 and #2 diesel fuel, #1 and #2 fuel oil, Jet A and JP-8. Gas fuels commonly used are propane, butane, and natural gas.

The main heat transfer methods used are convection and radiant. Forced air heaters use convection as its main method of heat transfer while radiant heaters use radiant heat transfer. Portable forced air heaters are used in consumer applications for space heating large, well ventilated spaces such as warehouses, factories, home garages, and open work areas where proper ventilation exists. There are both liquid and gas fired variants of forced air heaters that exist.

FIG. 14 shows a typical example of a liquid fired portable forced air heater 1 with an integral fuel tank. FIG. 15 shows a typical example of a gas fired portable forced air heater 2 which utilizes a separate fuel tank. Portable radiant heaters are also known and are typically used in consumer applications for local space heating where it is ideal to directly heat objects in the space instead of trying to heat the space indirectly by heating the air. They are typically liquid fuel burning and can be used anywhere that proper ventilation exists. FIG. 16 shows a typical example of a liquid fueled portable radiant heater 3.

The above types of heaters have historically utilized power from an A/C (alternating current) power source through a common plug interface. Portable heaters typically have at least some electrically powered components such as ignition coils, safety valves, fuel pumps, PCB control boards, and fan(s).

Battery-operated tools and equipment are also known. Manufacturers of such tools typically provide a battery platform with a somewhat unique design for interconnecting with a battery. Many batteries provided by one manufacturer are not interchangeable such that they can be used with tools of another manufacturer. Due to the lack of an industrial standard for connecting packaged batteries of a given voltage to devices from various manufacturers, there exists a plurality of distinctive battery connections that are not directly interchangeable. Currently, this makes it impossible to use batteries from one manufacturer on devices from another manufacturer.

An example prior art battery 10 of a first type is shown at FIG. 17 having a housing or main body 12 within which a plurality of battery cells (not shown) are secured, electrical contacts 14, a pair of side channel structures 16, a spring-biased latch member 18, and a release button 20. In one aspect, the latch member 18 is biased in a first direction along an axis Z (i.e., a vertical axis as shown in the drawing) by a spring into a latched position and the release button can be depressed by an operator to move the latch member 18 in a direction opposite the first direction into an unlatched position. For this type of battery, a corresponding tool will have a pair of wall structures that are slidably received into the side channel structures 16 along a longitudinal axis X, which is orthogonal to the axis Z. As the battery 10 is inserted onto the tool in such a manner, the latch member 18 will initially be depressed by a surface of the tool until the battery 10 is fully inserted onto the tool, at which point the latch member 18 is received into a cavity of the tool and held in place by the biasing spring. In this position, the battery 10 is secured by the latch member 18 until an operator depresses the release button to retract the latch member 18 such that the battery 10 can be slid away from the tool whereby the side channel structures 16 are clear of the tool wall structures.

Another example of a prior art battery 30 is shown at FIG. 18 which also includes a housing or main body 32, electrical contacts 34, and a pair of side channel structures 36 that are arranged generally similarly to the battery 10. However, in contrast to the battery 10, the battery 30 is provided with a pair of lateral spring-biased latch members 38 that are located adjacent the channel structures and a pair of release buttons 40. The latch members 38 are biased outwardly from the housing 32 along a lateral axis Y, which is orthogonal to both the longitudinal axis X and to the axis Z. Similarly, the release buttons 40 are depressed along the axis Y to move the latch members 38 from the latched positon to the unlatched position. With a battery of this type, the battery channels 36 are slid onto the wall structures of the tool until the latch members 38 are received into corresponding lateral recesses on the tool, at which point the battery 30 is secured to the tool. Due to these different latch configurations, and also due to some variations in the channel structure dimensions and the location of the contacts, tools configured for use with a battery 10 of the type shown at FIG. 17 cannot receive a battery 30 of the type shown in FIG. 18. Likewise, tools configured for use with a battery 30 of the type shown at FIG. 18 cannot receive a battery 10 of the type shown in FIG. 17. The batteries 10, 30 can be of any standard or nominal voltage, for example, 12, 18, or 20 volts.

Recently, battery powered portable heaters have been devised which provide the same utility even when access to the grid power is inconvenient or impossible. They can utilize either an internal battery or an externally mounted battery. Although some battery-powered heater designs now exist, they still suffer from the same condition that they only accept batteries of the same manufacturer.

SUMMARY

The present disclosure relates, in part, to fitting widely available rechargeable packaged batteries to a broad range of battery powered devices, notably portable heaters of the type shown and described in FIGS. 14 to 16 configure to interchangeably use, for examples, batteries of the type shown at FIGS. 17 and 18.

A portable heater can include a housing, a burner disposed within the housing, one or more electrical components for operating the burner, and a power interface for connecting with one of a plurality of power sources, the power interface being configured to deliver power to the one or more electrical components from a connected power source. The power interface can include a plurality of electrical contacts, a first connection arrangement for receiving a battery of a first type having a first set of interconnection features, and a second connection arrangement for receiving a battery of a second type, the second battery type having a second set of interconnection features different from the first set of interconnection features.

In some examples, the power interface includes a third connection arrangement provided with electrical connections for receiving a female plug from an A/C power source.

In some examples, the one or more electrical components includes one or more of an ignition coil, a safety valve, a fuel pump, a control board, and fan(s).

In some examples, the first connection arrangement includes one or more first latch recesses.

In some examples, the second connection arrangement includes one or more second latch recesses.

In some examples, the power interface includes an adapter plate.

In some examples, the adapter plate defines a major surface and one or more side surfaces that together define a recess for receiving the battery of the first or second type.

In some examples, the first connection arrangement includes one or more first latch recesses defined in the major surface of the adapter plate.

In some examples, the second connection arrangement includes one or more second latch recesses extending from the one more side surfaces.

In some examples, the adapter plate includes a pair of oppositely facing wall structures spaced from and extending over the major surface, the wall structures being configured to be received into channel structures of a battery of the first and second types.

In some examples, the adapter plate further includes a central recess and opening through the major surface for receiving prongs of an electrical plug.

In some examples, the electrical contacts are movable relative to the adapter plate.

In some examples, the electrical contacts are fixed relative to the adapter plate.

In some examples, the first connection arrangement further includes a first set of surfaces defined by the pair of oppositely facing wall structures and the second arrangement further includes a second set of surfaces defined by the pair of oppositely facing wall structures, the second set of surfaces being different from the first set of surfaces.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a top schematic view of an adapter plate of the power interface shown in FIG. 5.

FIG. 8 is a schematic bottom view of the adapter plate in FIG. 7.

DETAILED DESCRIPTION

Figure 1:
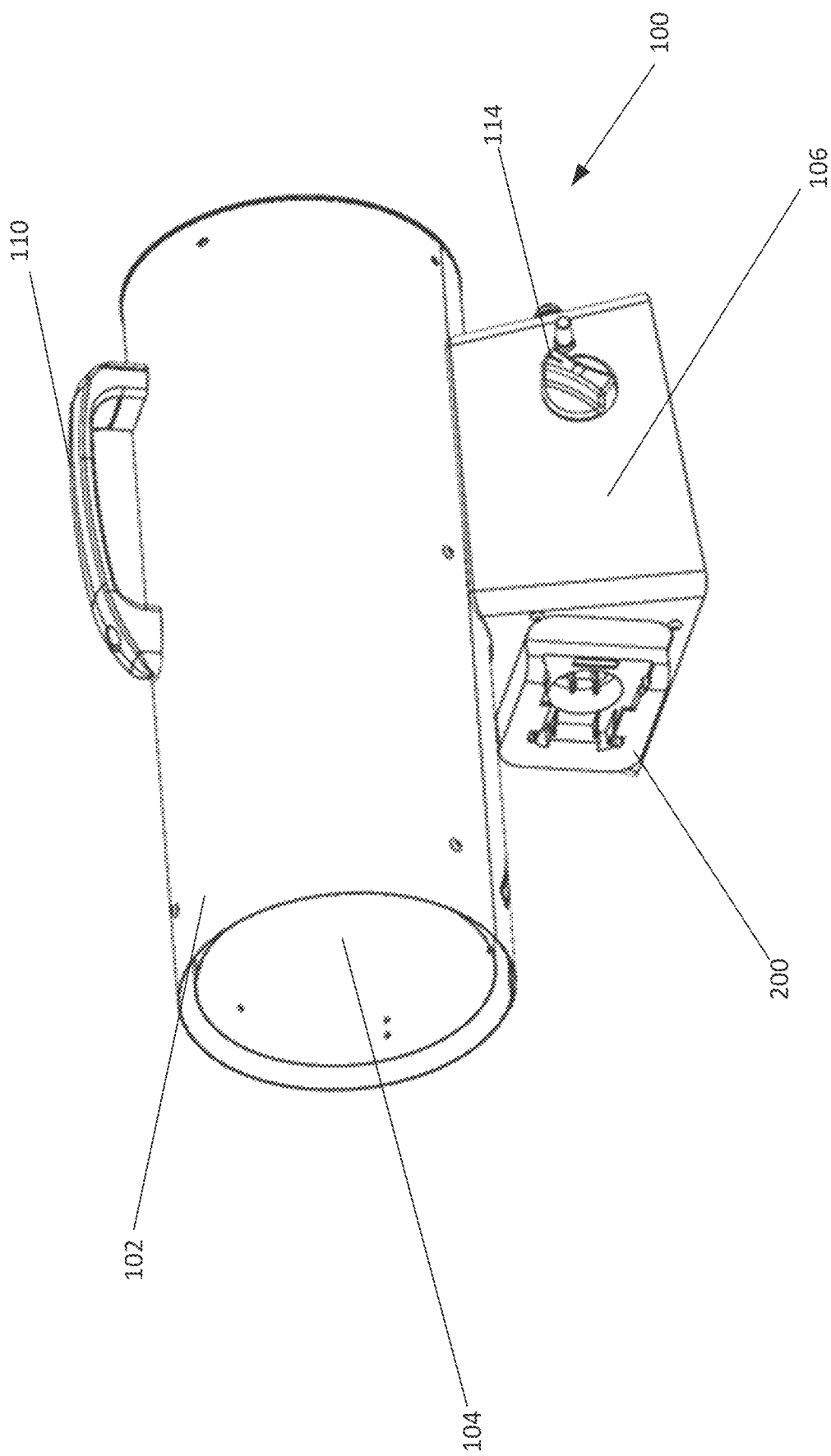
FIG. 1 is a view of a portable heater including a power interface having features in accordance with principles of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Referring to FIG. 1, a portable heater 100 is presented. As shown, the portable heater 100 is configured as a gas fired heater with a housing 102 within which a burner assembly 104 and a blower fan 106 are disposed. The portable heater 100 is also shown as including a base 108 supporting the housing 102 and a handle 109 for carrying the portable heater. The portable heater 100 is also provided with an electrical power and control system 110, which is shown at FIG. 2 as including a control switch 114 for operating the heater 100 and a power interface 200 for supplying electrical power to the heater 100.

Figure 2:
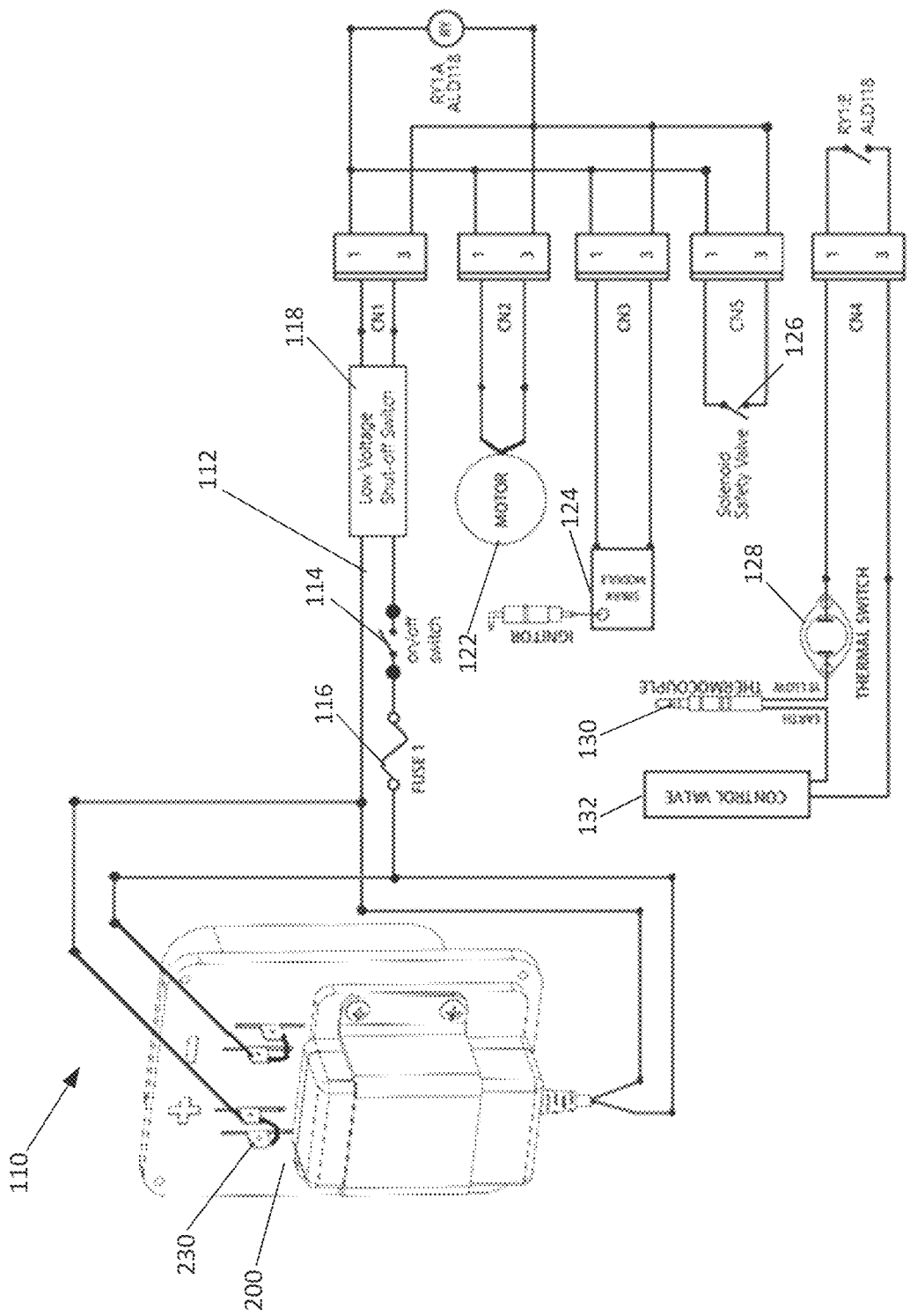
FIG. 2 is a schematic view of the power interface shown in FIG. 1 and a power and control circuit of the portable heater shown in FIG. 1.

Referring to FIG. 2, additional components of the electrical power and control system 110 are shown. In one aspect, the electrical system 110 includes a circuit 112 to which the power interface 200 is connected and within which the control switch 114 is disposed. Additional electrical components are also shown as being connected to the circuit 112. For example, a fuse 116, a low voltage shut-off switch 118, an electrical motor 122, an ignitor and spark module 124, a solenoid safety valve 126, a thermal switch 128, a thermocouple 130, and a fuel control valve 132 are also shown. Other components may also be provided for the operation of the heater 100. In operation, the power interface 200 connects with either a battery or plug to provide a direct current to the circuit 112 such that the electrical components can be powered to perform their known functions with respect to the operation of a fuel-based heater. In contrast to heaters with only A/C power, the inclusion of the low-voltage shut-off switch 118 enables the circuit 112 to shut off when battery voltage falls below a predetermined level in order to protect the battery.

Figure 3:
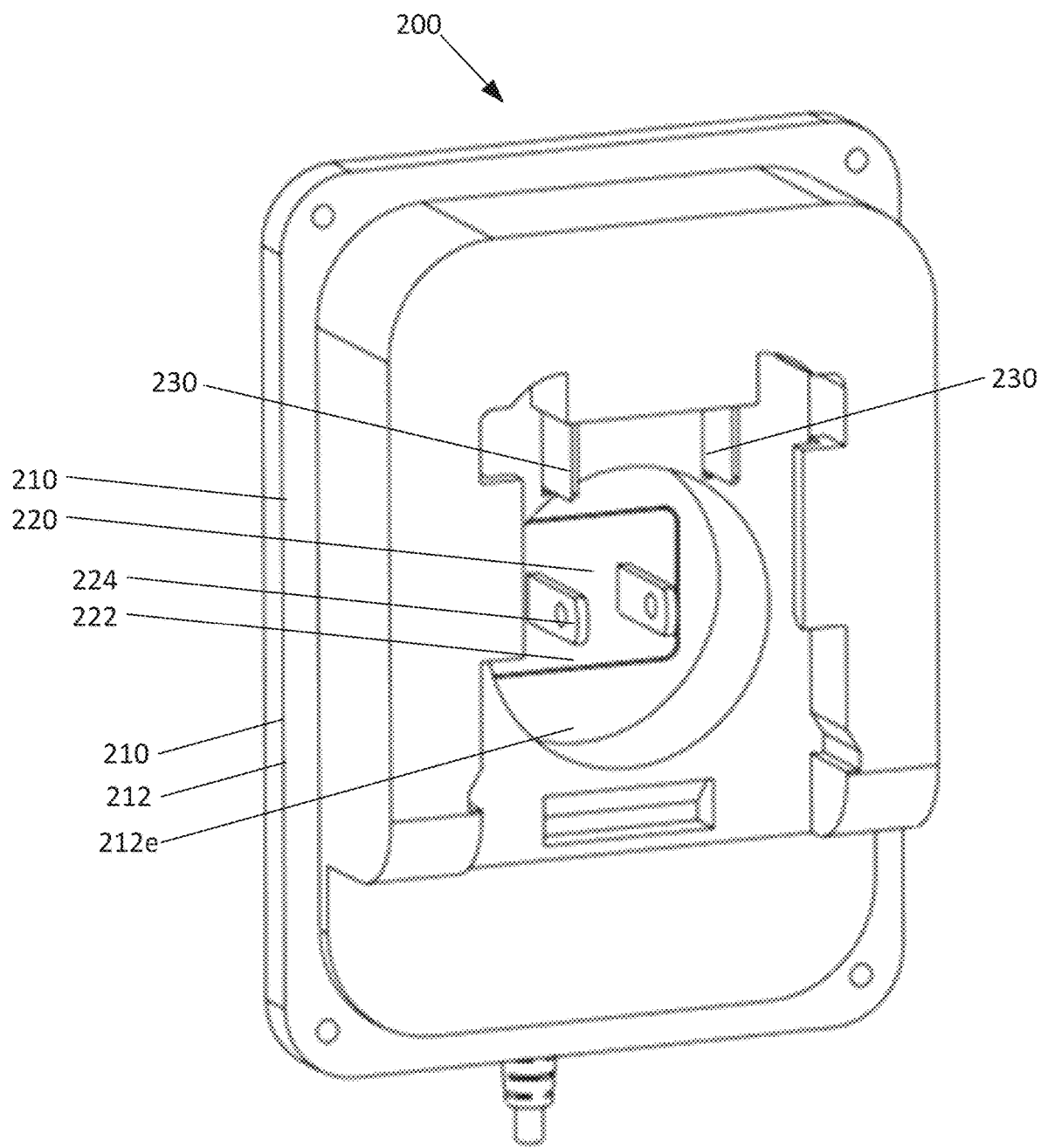
FIG. 3 is a front perspective view of the power interface shown in FIG. 1.
Figure 4:
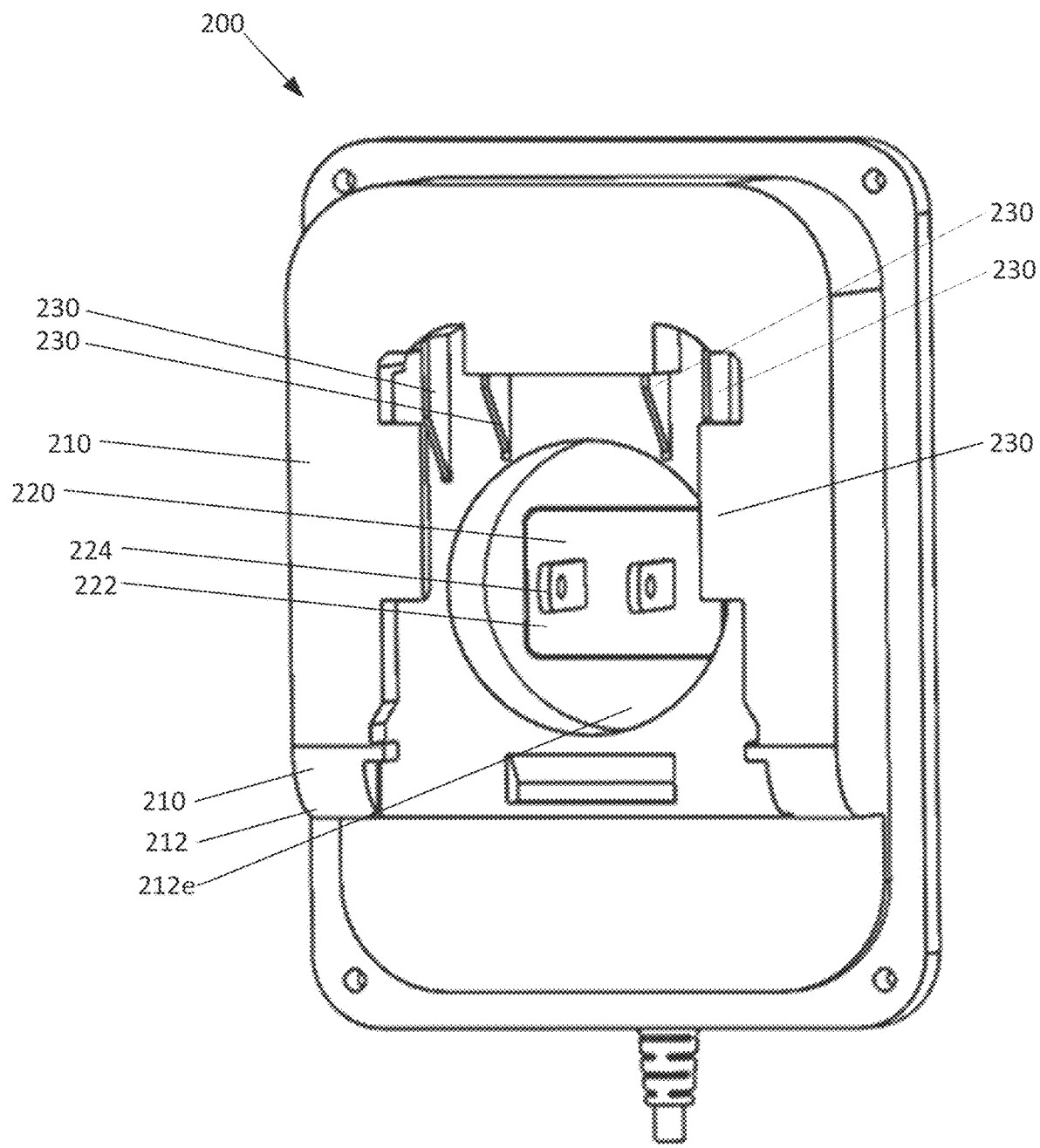
FIG. 4 is a front perspective view of the power interface shown in FIG. 1.
Figure 5:
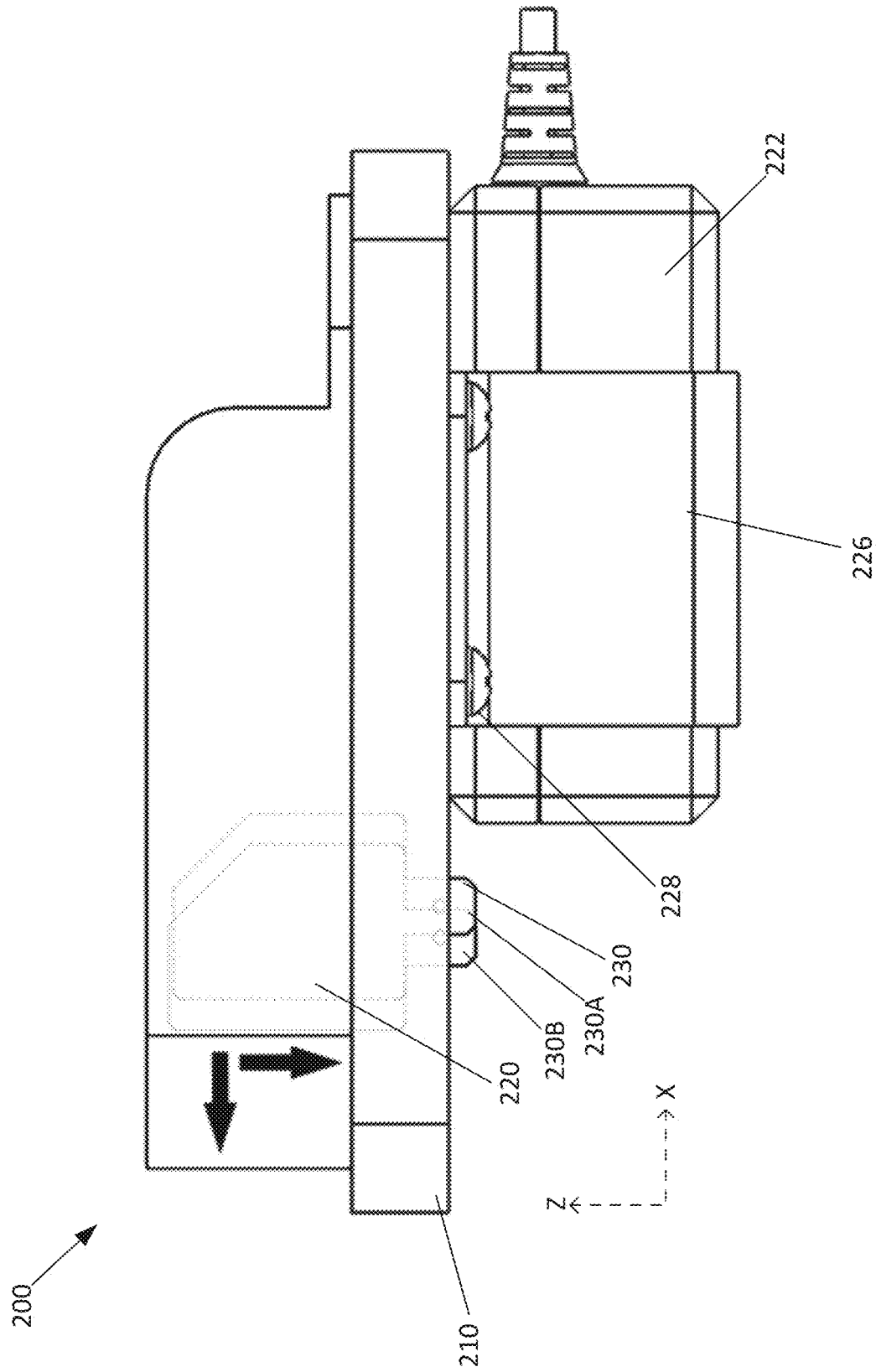
FIG. 5 is a side view of the power interface shown in FIG. 1.

Referring to FIGS. 3 to 13, aspects of the power interface 200 are presented in further detail. In one aspect, and as illustrated at FIGS. 3 to 5, the power interface 200 includes an AC/DC power supply 220 mounted to a back side of an adapter plate 210 with a strap 226 and fasteners 228. As configured, the power supply 220 includes a housing 222 from which a pair of electrical prongs 224 extend through an opening 212g in the adapter plate 210. Accordingly, an electrical plug from a power source can be connected to the power supply 220 when a battery is not used or available to power the heater 100. The adapter plate 210 is provided with electrical contacts 230 mounted to the main body 212 that engage with corresponding contacts on a battery, when a battery is installed onto the adapter plate 210. As shown at FIG. 2, the power supply 220 and the electrical contacts 230 are both wired into the circuit 112 such that power can be supplied to the circuit by either a plugged connection via the power supply 220 or via a battery engaged with the electrical contacts 230.

Advantageously, the power interface 200 is configured to receive different types of rechargeable batteries having different connection mechanisms. In the particular example shown, the power interface 200 is configured to receive either a battery 10 of the type shown in FIG. 17 or a battery 30 of the type shown in FIG. 18.

Figure 6:
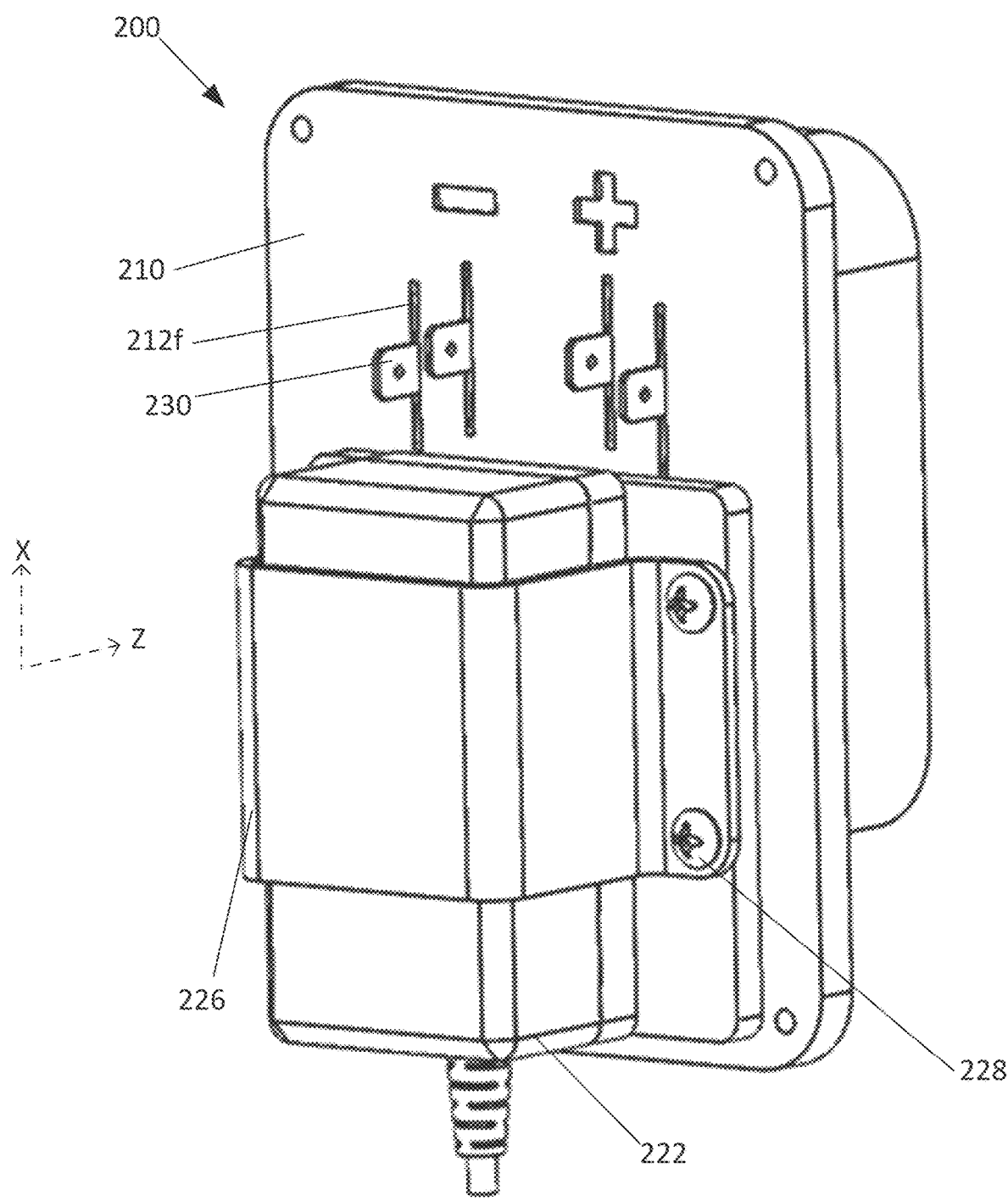
FIG. 6 is a rear perspective view of the power interface shown in FIG. 1.
Figure 9:
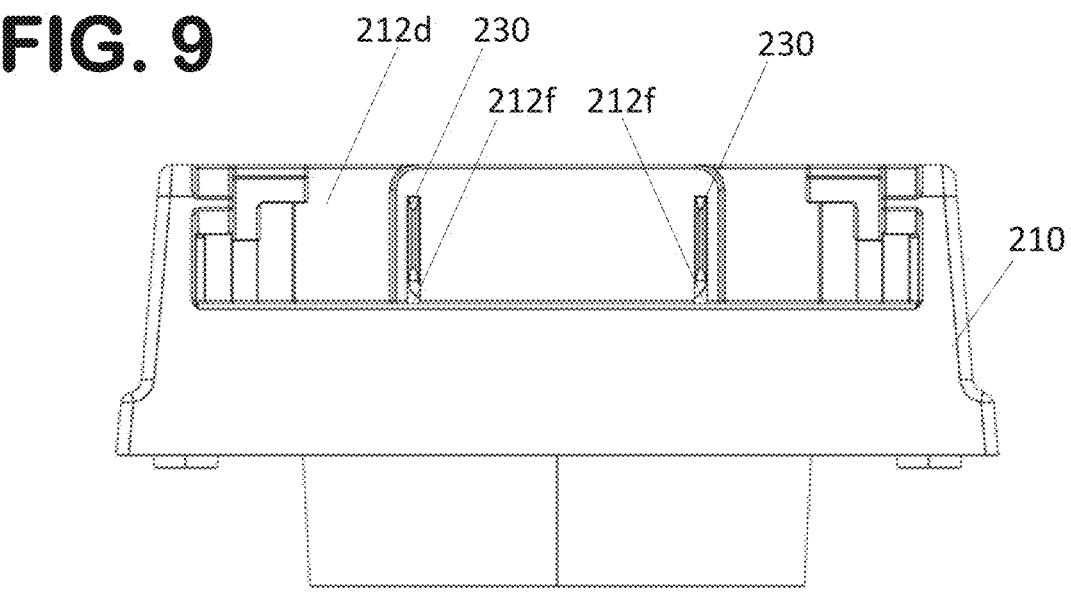
FIG. 9 is a schematic end view of the adapter plate shown in FIG. 7.
Figure 10:
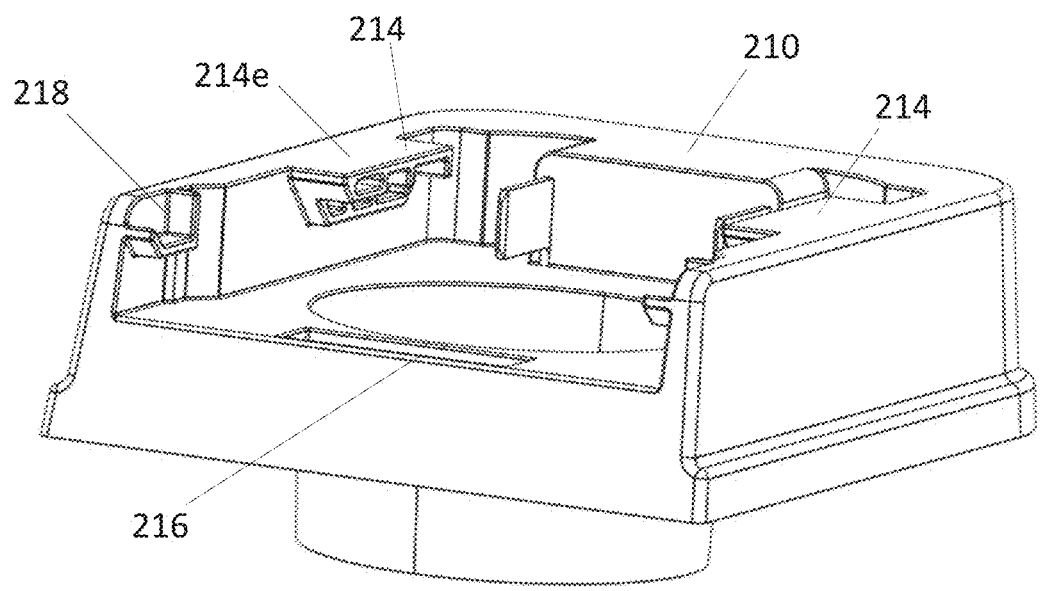
FIG. 10 is a schematic top perspective view of the adapter plate shown in FIG. 7.
Figure 11:
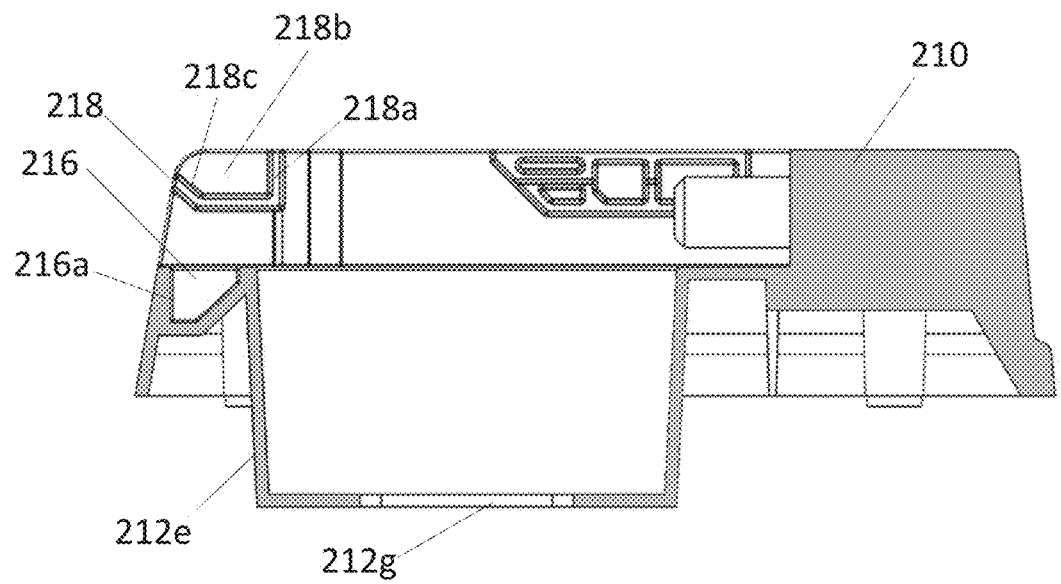
FIG. 11 is a schematic centerline side cross-sectional view of the adapter plate shown in FIG. 7.
Figure 12:
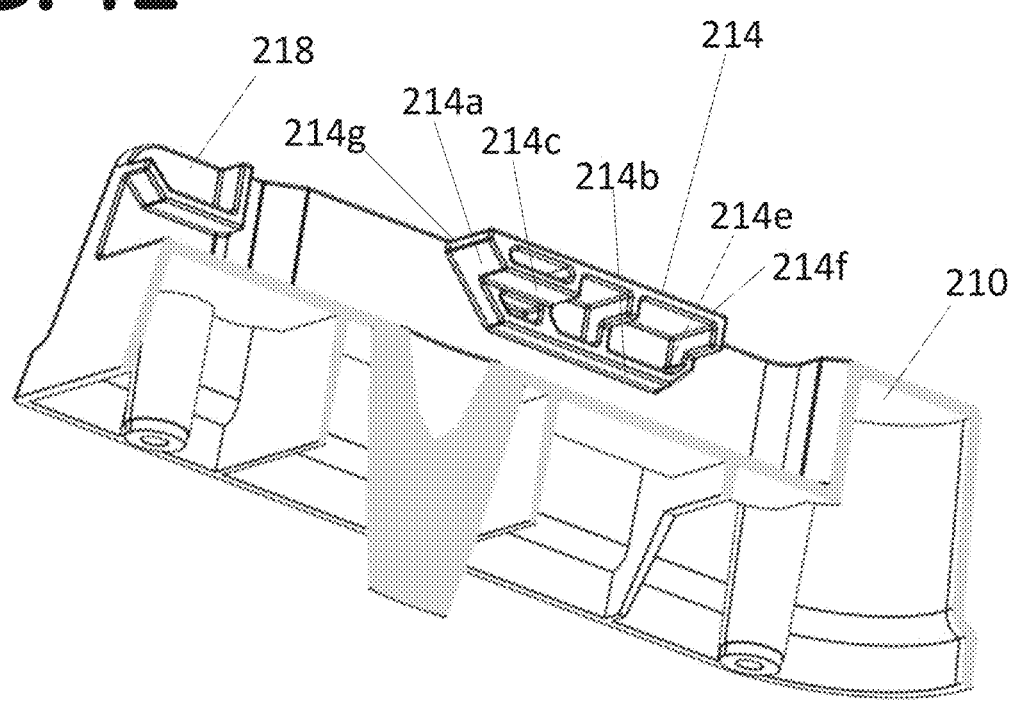
FIG. 12 is a schematic bottom perspective partial cross-sectional side of the adapter plate shown in FIG. 7, taken along the line 12-12 in FIG. 7.
Figure 13:
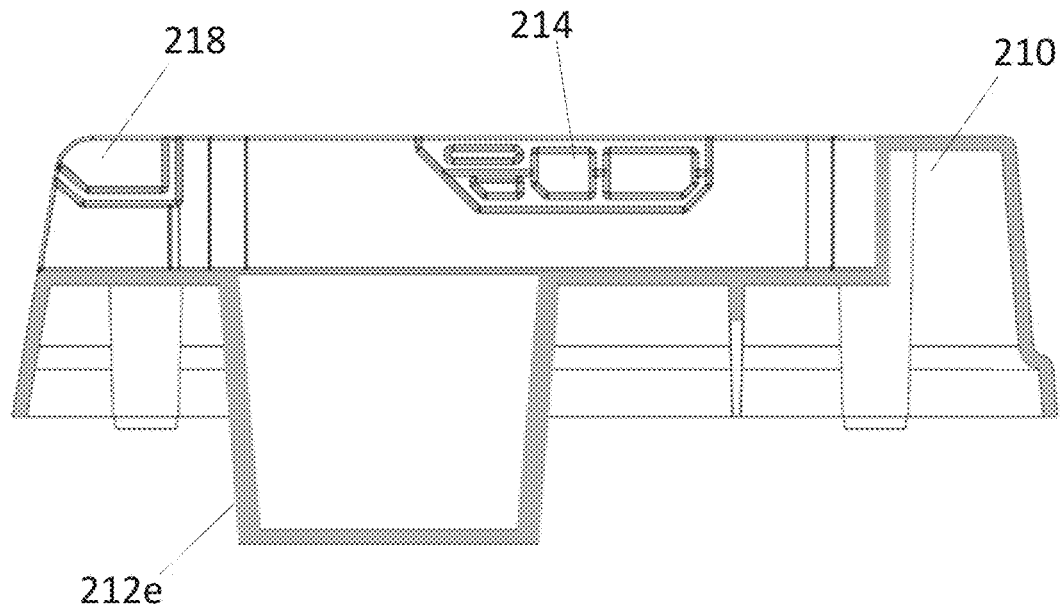
FIG. 13 is a schematic cross-sectional side view of the adapter plate shown in FIG. 7, taken along the line 12-12 in FIG. 7.
Figure 14:
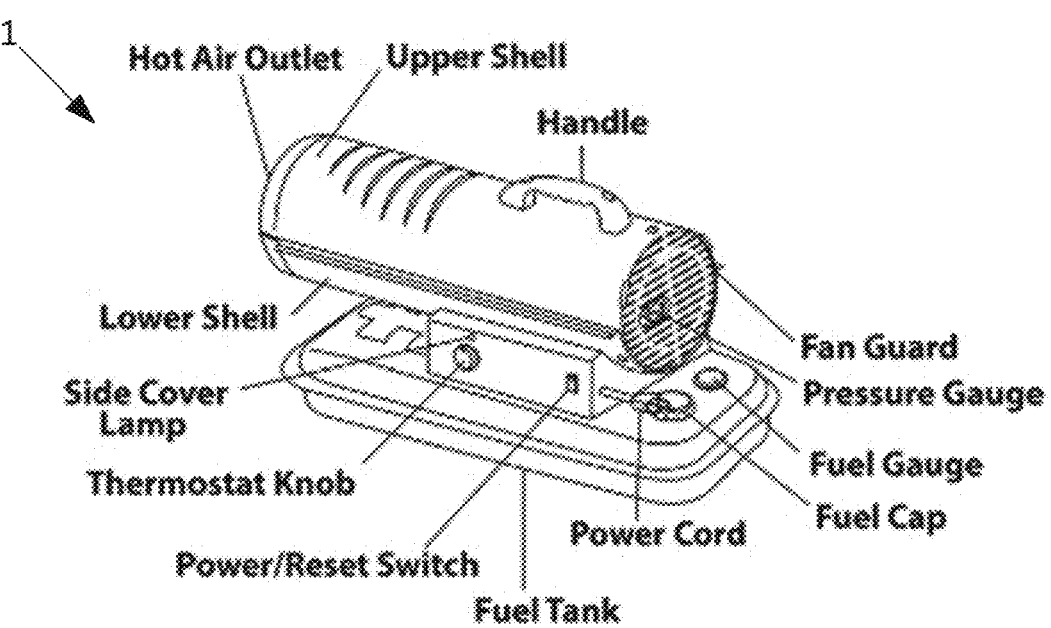
FIG. 14 is a perspective view of a prior art portable heater.
Figure 15:
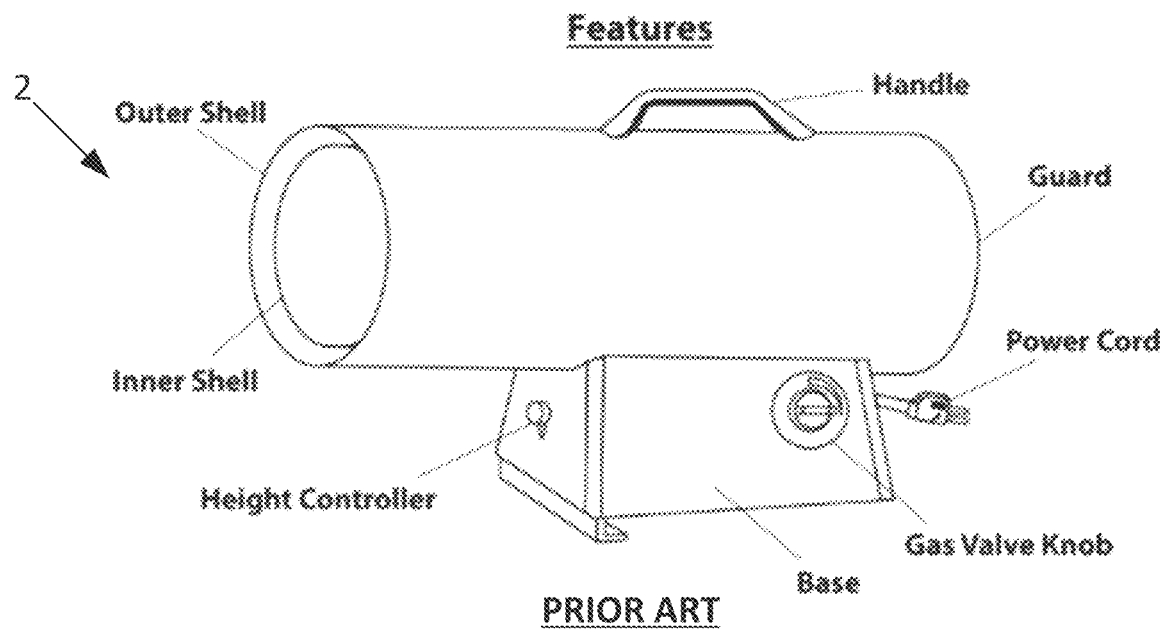
FIG. 15 is a perspective view of a prior art portable heater.
Figure 16:
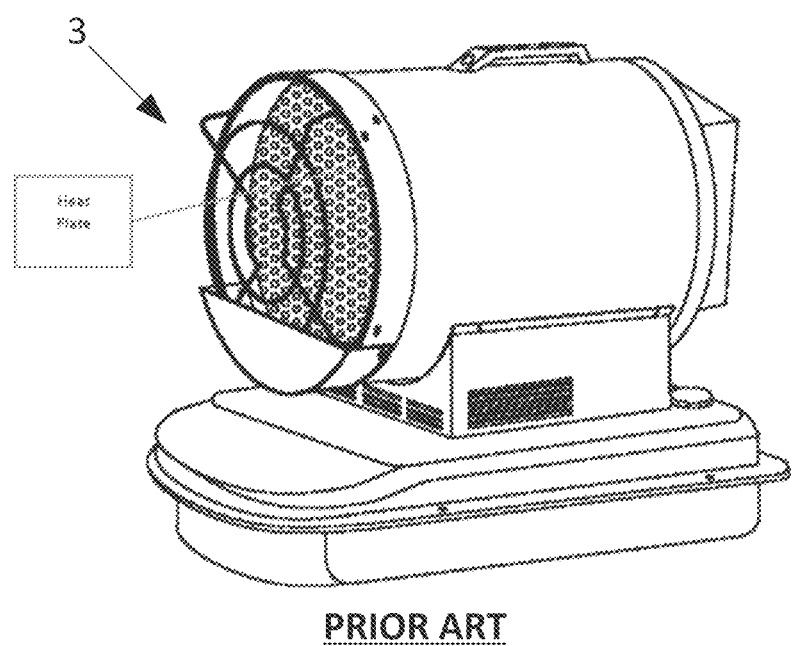
FIG. 16 is a perspective view of a prior art portable heater.

With reference to FIGS. 5 and 6, it is illustrated that the contacts 230 can be configured to be displaceable along the axis X and along the axis Z between a first position 230A and a second position 230B via slots 212f in the adapter plate 210. As shown, the contacts 230 are spring biased into the position 230A and are displaceable into the position 230B, wherein position 230B is offset in both the X and Z axes with respect to position 230A. With the disclosed configuration, the contacts 230 can be located in the first position 230A to receive, for example battery 10, and the contacts 230 can be located in the second position 230B to receive, for example, battery 30. In some examples, more or fewer contacts 230 can be provided, such as two contacts. In some examples, the contacts 230 can be displaceable along only a single axis, displaceable along three axes, or secured in a fixed position. This latter configuration is shown at FIGS. 7-19, whereby a slightly modified adapter plate 210 is shown as being configured to receive and retain a single pair of contacts 230 in a fixed position.

With reference to FIGS. 7-19, the adapter plate 210 is presented in further detail. As previously noted, the adapter plate 210 defines a main body 212 with various features configured for connecting batteries of different types. In one aspect, the main body 212 defines a major surface 212a, and sidewall surfaces 212b, 212c, 212d that generally define a recess or cavity area 212e for receiving the battery 10 or 30. In one aspect, the wall 212d includes slots or opening 212f for allowing the contacts 230 to pass from a top side of the main body 212 to a bottom side, where the contacts 230 can be secured to the main body with fasteners, such as screws. In one aspect, the recess or cavity area 212e of the main body 212 defines a central opening 212g for receiving the prongs 224 of the power supply 220 extends below the major surface 212a. In one aspect, the recess area 212a is provided with a depth greater than the length of the prongs 224 such that the prongs 224 do not interfere with the battery 10 or 30, when installed.

Figure 17:
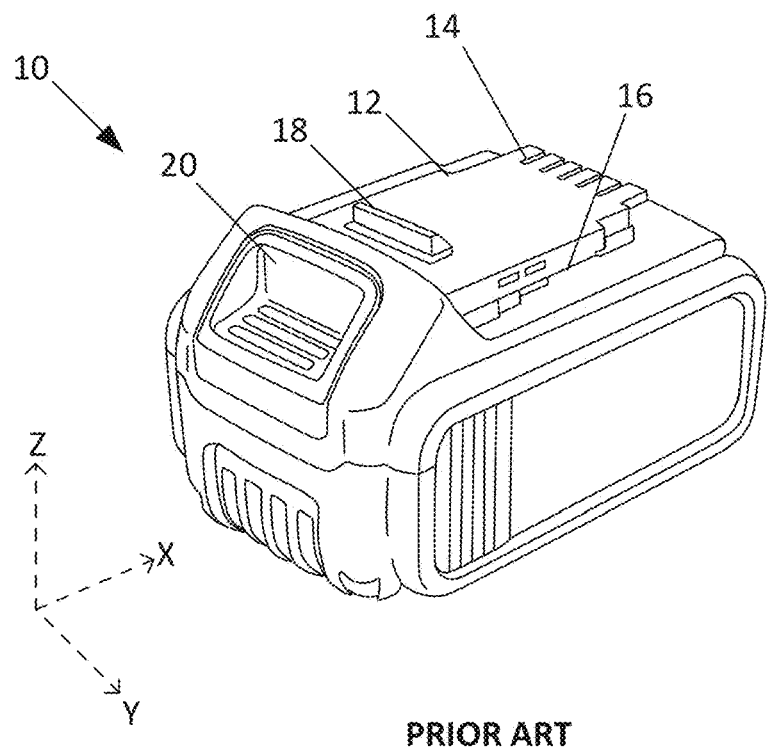
FIG. 17 is a perspective view of a prior art rechargeable battery of a first type.
Figure 18:
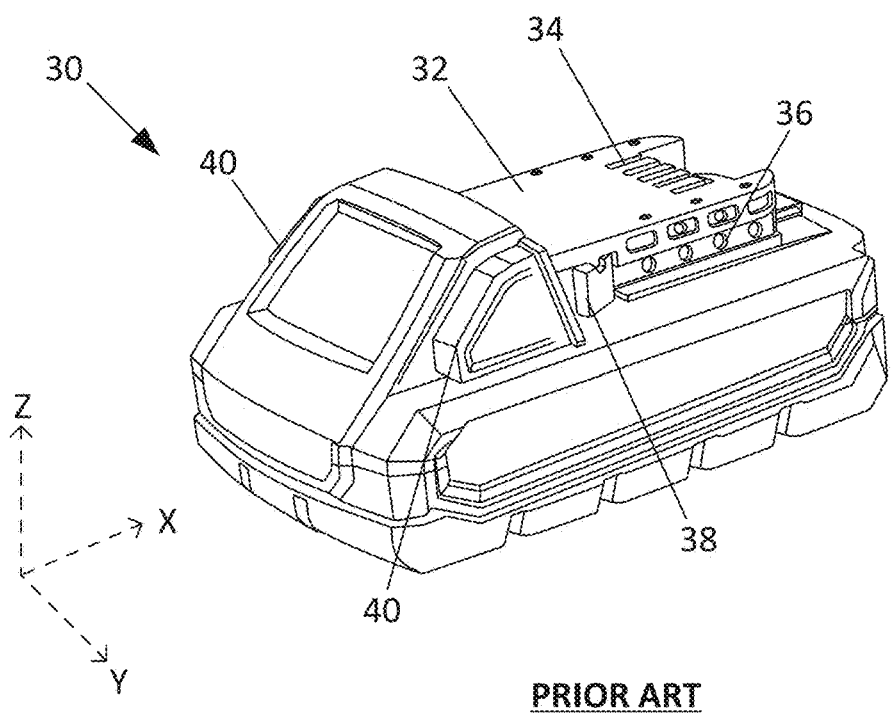
FIG. 18 is a perspective view of a prior art rechargeable battery of a second type.

In one aspect, the adapter plate is provided with a pair of identically shaped, oppositely opposing wall structures 214 extending from the sidewall surfaces 212b, 212c and over the major surface 212a. The wall structures 214 are provided with various structures that are received into the channel structures 16, 36 of either an installed battery 10 or battery 30 and function to retain the battery 10, 30 onto the adapter plate 210. As shown, each wall structure 214a is provided with surfaces 214a, 214b, and 214c which generally face towards the major surface 212a. As shown, surface 214a is oriented at an oblique angle to the major surface 212a and functions as a ramped surface or guide such that the wall structures 214 can be received into the channel structures 16, 36 of an installed battery 10, 30. The wall structure 214 is further defined by a top surface 214d that faces in an opposite direction relative to the surfaces 212b, 214c. In one aspect, the surfaces 214b, 214c, 214d are parallel to the major surface 212a. The wall structures 214 are also shown as defining surfaces 214e, 214f which are orthogonally oriented with respect to the major surface 212a. The wall structures are further shown as including a surface 214g that can function to provide a stop surface for the battery 10, 30 during installation. When a battery 10 of the type shown in FIG. 17 is installed onto the adapter plate 210, the surfaces 214a, 214b, and 214c of each wall structure 214 are received within and engaged with the channel structures 16 of the battery 10. When a battery 30 of the type shown in FIG. 18 is installed onto the adapter plate 210, the surfaces 214b are received within and engaged with the channel structures 36 of the battery 30.

The adapter plate 210 is further shown as including a first latch recess 216 extending downward from the major surface 212a. As configured, the latch recess 216 includes a cavity portion 216a and a catch surface 216b. The latch recess 216 functions to receive the latch member 18 when a battery 10 of the type shown in FIG. 17 is installed. Once installed, the catch surface 216b engages against the latch member 18 to prevent the battery 10 from being slid along the axis X relative to the adapter plate 210. As the interaction between the wall structures 214 and the channel structures 16 prevent the battery 10 from moving along the axis Z, the battery 10 is fully secured to the adapter plate 210 when the latch member 18 is engaged in the latch recess 216. When a battery 30 of the type shown in FIG. 18 is installed onto the adapter plate 210, the latch recess 216 is unused.

The adapter plate 210 is further shown as including a pair of second latch recesses 218 extending inwardly from the wall surfaces 212b, 212c. As configured, the latch recesses 218 are defined by a wall structure 218a that defines a cavity portion 218b and a catch surface 218c. The latch recesses 218 function to receive the latch members 38 when a battery 30 of the type shown in FIG. 18 is installed. Once installed, the catch surfaces 218c engage against the latch members 38 to prevent the battery 30 from being slid along the axis X relative to the adapter plate 210. As the interaction between the wall structures 214 and the channel structures 36 prevent the battery 30 from moving along the axis Z, the battery 30 is fully secured to the adapter plate 210 when the latch members 38 is engaged in the latch recesses 218. When a battery 10 of the type shown in FIG. 17 is installed onto the adapter plate 210, the latch recesses 218 are unused.

In one aspect, the power interface 200, with the above-described features, can be characterized as including a first connection arrangement for receiving a first battery type, for example battery 10, and a second connection arrangement for receiving a second battery type, for example battery 30. Accordingly, the features associated with a first connection arrangement can be characterized as including the latch recess 216 and the surfaces 214a, 214b, and 214c. Similarly, the features associated with a second connection arrangement can be characterized as including the latch recesses 218 and the surfaces 214b. With the disclosed power supply 200, not only can A/C power be provided to the heater 100, but also power from batteries of different manufacturer, thereby by giving an operator the greatest flexibility possible in operating the heater 100.

What is claimed is:

1. A portable heater comprising:
   a housing;
   a burner disposed within the housing;
   one or more electrical components for operating the burner; and
   a power interface for connecting with one of a plurality of power sources, the power interface being configured to deliver power to the one or more electrical components from a connected power source, the power interface including:
      a plurality of electrical contacts;
      a single adapter plate having a first side and an opposite second side, the first side defining a first connection arrangement and a separate second connection arrangement;
      a power supply mounted to the second side of the single adapter plate, the power supply having a pair of prongs extending through a central opening in the adapter plate such that the pair of prongs can be received by an electrical plug extending from the first side of the adapter plate;
      the first connection arrangement being for directly receiving a first battery of a first type having a first set of interconnection features, the first connection arrangement including a plurality of first wall structures for securing the first battery to the power interface; and
      the second connection arrangement being for directly receiving a second battery of a second type, the second battery type having a second set of interconnection features different from the first set of interconnection features, the second connection arrangement including a plurality of second wall structures, different from the plurality of first wall structures, for securing the second battery to the power interface.

2. The portable heater of claim 1, wherein the power interface includes the power supply having the pair of prongs for receiving a female plug from an A/C power source, the pair of prongs extending through the central opening of the adapter plate.

3. The portable heater of claim 1, wherein the one or more electrical components includes one or more of an ignition coil, a safety valve, a fuel pump, and a control board.

4. The portable heater of claim 1, wherein the plurality of first wall structures includes one or more first latch recesses.

5. The portable heater of claim 4, wherein the second connection arrangement includes one or more second latch recesses.

6. The portable heater of claim 1, wherein the first side of the adapter plate defines a major surface and one or more side surfaces that together define a recess for receiving the first or second battery.

7. The portable heater of claim 6, wherein the first connection arrangement includes one or more first latch recesses defined in the major surface of the adapter plate.

8. The portable heater of claim 7, wherein the second connection arrangement includes one or more second latch recesses extending from the one more side surfaces.

9. The portable heater of claim 6, wherein the adapter plate includes a pair of oppositely facing wall structures spaced from and extending over the major surface, the wall structures being configured to be received into channel structures of the first and second batteries.

10. The portable heater of claim 6, wherein each of the plurality of electrical contacts is movable relative to the adapter plate, wherein, in a first position, the plurality of electrical contacts are configured to be received within the first battery of the first connection arrangement, and wherein, in a second position, the plurality of electrical contacts are configured to be received within the second battery of the second connection arrangement.

11. The portable heater of claim 6, wherein each of the plurality of electrical contacts is fixed relative to the adapter plate.

12. The portable heater of claim 9, wherein the first connection arrangement further includes a first set of surfaces defined by the pair of oppositely facing wall structures and the second connection arrangement further includes a second set of surfaces defined by the pair of oppositely facing wall structures, the second set of surfaces being different from the first set of surfaces.

13. A power interface for supplying power to a device requiring electrical power, the power interface comprising:
   a plurality of electrical contacts;
   a single adapter plate having a first side and an opposite second side, the first side defining a first connection arrangement and a separate second connection arrangement;
   a power supply mounted to the second side of the single adapter plate, the power supply having a pair of prongs extending through a central opening in the adapter plate such that the pair of prongs can be received by an electrical plug extending from the first side of the adapter plate;
   the first connection arrangement being for directly receiving a battery of a first type having a first set of interconnection features for securing the battery to the power interface;
   the second connection arrangement being for directly receiving a battery of a second type, the second battery type having a second set of interconnection features for securing the battery to the power interface and that are different from the first set of interconnection features; and
   the power supply being for supplying power to the device and the pair of prongs being for receiving a female plug from an A/C power source.

14. The power interface of claim 13, wherein one or both of the first connection arrangement and second connection arrangement includes one or more latch recesses.

15. The power interface of claim 13, wherein the adapter plate defines a major surface and one or more side surfaces that together define a recess for receiving the battery of the first or second type, wherein the power supply is attached to the adapter plate on a side opposite the major surface and wherein the pair of prongs extends through the central opening defined in the adapter plate.

16. The power interface of claim 15, wherein the first connection arrangement includes one or more first latch recesses defined in the major surface of the adapter plate.

17. The power interface of claim 16, wherein the second connection arrangement includes one or more second latch recesses extending from the one more side surfaces.

18. The portable heater of claim 1, wherein the power supply is mounted to the second side of the adapter plate by a strap and fasteners, wherein the power supply is mounted below the plurality of electrical contacts.

19. The power interface of claim 13, wherein the power supply is mounted to the second side of the adapter plate by a strap and fasteners, and wherein the power supply is mounted below the plurality of electrical contacts.

20. The portable heater of claim 10, wherein the plurality of electrical contacts are spring biased into the first position, and wherein the plurality of electrical contacts are displaceable to the second position.

21. The power interface of claim 13, wherein each of the plurality of electrical contacts is movable relative to the adapter plate, wherein, in a first position, the plurality of electrical contacts is configured to be received within the battery of the first connection arrangement, wherein, in a second position, the plurality of electrical contacts are configured to be received within the battery of the second connection arrangement, and wherein the plurality of electrical contacts are spring biased into the first position, and wherein the plurality of electrical contacts are displaceable to the second position.

* * * * *